United States Patent Office 3,113,959
Patented Dec. 10, 1963

3,113,959
PROCESS FOR THE MANUFACTURE OF
ADIPO-DINITRILE
Kurt Sennewald and Armin Götz, Knapsack, near Cologne, and Gottfried Kallrath, Kerpen, near Cologne, Germany, assignors to Knapsack-Griesheim Aktiengesellschaft, Knapsack, near Cologne, Germany, a corporation of Germany
No Drawing. Filed July 5, 1960, Ser. No. 40,568
Claims priority, application Germany July 11, 1959
3 Claims. (Cl. 260—465.8)

The present invention is concerned with a process for the manufacture of adipo-dinitrile by a hydrogenizing splitting of 1,2-dicyanocyclobutane.

It is known that cyclobutane can be thermally split to yield ethylene. The production of butane by subjecting cyclobutane to a hydrogenizing splitting has also been described, this splitting being carried out in a manner such that cyclobutane is conducted in the vaporous state at a temperature of about 200° C., together with hydrogen, over nickel as catalyst.

In the tests carried out within the scope of the present invention for the splitting of 1,2-dicyanocyclobutane, we have found that 1,2-dicyanocyclobutane can be completely split to yield acrylonitrile by a hydrogenation in the gaseous phase, for example in the presence of a nickel catalyst, similar to the known splitting of cyclobutane to ethylene. However, a partial splitting between the two carbon atoms carrying the cyano group to obtain adipo-dinitrile could not be realized in that manner. Further tests showed that working with a pure nickel catalyst under pressure in the liquid phase also meets with failure even in the presence of a solvent.

Now we have found that hydrogenizing splitting sets in between the two carbon atoms carrying the cyano group and the product of this hydrogenizing splitting, i.e. adipo-dinitrile, can be isolated when the process is carried out under pressure in the presence of a polar organic solvent, with the use of a nickel catalyst which has been activated with alkali and is supported on kieselguhr. Instead of kieselguhr, silica gel may, for example, be used as carrier substance.

It has been found that the time necessary for the treatment depends on the temperature. The splitting reaction sets in at about 200° C. When the process is carried out at a temperature below 250° C., only very small quantities of adipo-dinitrile can be isolated after one hour. After about 3 hours, however, a maximum yield is obtained while a hydrogenation beyond that time leads to condensation reactions so that after 5 hours only very small quantities of adipo-dinitrile are obtained, in addition to a quantity of condensation products. When the process is carried out at a temperature of 280° C., a preferred duration of experiment is obtained which is lower and amounts to about 2 hours, while after only 3 hours relatively small quantities of adipo-dinitrile are obtained, in addition to larger quantities of condensation products. At a temperature of 400° C., the optimum duration amounts to about 30 minutes.

The pressure to be used in the process of the invention should exceed 100 atmospheres gage and should always be so high that the reaction mixture is in the form of its solution at the working temperature used in a given case. As already stated in the foregoing, adipo-dinitrile cannot be prepared when the reaction mixture is predominantly in the form of vapour. The minimum pressure necessary at a given working temperature can be determined in dependence on the nature of the solvent and the composition of the reaction mixture with regard to the ratio of solvent to 1,2-dicyanocyclobutane. With dioxan and a ratio by weight of solvent to 1,2-dicyanocyclobutane of about 1:1, the necessary minimum pressure amounts to about 150 atmospheres gage. Advantageously, pure hydrogen is used; a mixture of hydrogen with an inert gas, for example nitrogen and/or argon, may, however, also be used. The use of such mixture may be particularly advantageous when a highly diluted solution is used.

The adipo-dinitrile distilled off from the reaction product after the pressure has been released can be reduced in known manner without further purification, for example by reduction in the presence of Raney cobalt, to hexamethylene diamine which is of increasing industrial importance as starting product for the manufacture of polyamides. Thus, according to the invention, 1,2-dicyanocyclobutane is dissolved in a polar organic solvent and treated with hydrogen under pressure at a temperature within the range of about 200 and about 400° C. in the presence of a hydrogenation catalyst which has been activated with an alkali metal oxide and the adipo-dinitrile formed is distilled off after the pressure has been released. The hydrogenation is advantageously carried out at a temperature within the range of about 250 to about 300° C. The pressure used amounts to about 100 atmospheres gage, advantageously above 150 atmospheres gage, and is chosen in dependence on the splitting temperature in a manner such that the batch is in the form of its solution. The reaction time is in inverse proportion to the splitting temperature of about 200° C. to about 400° C. and ranges from about 3 hours to about ½ hour.

As polar organic solvent, dioxan is preferably used. As hydrogenation catalyst there is used, for example, a nickel catalyst, containing sodium oxide and small amounts of iron oxide and aluminum oxide, which is supported on kieselguhr. For the preparation of this hydrogenation catalyst, natural kieselguhr is impregnated with an aqueous solution of nickelous chloride, treated at about 70 to about 80° C. with a sodium carbonate solution, dried and then treated with hydrogen at about 350° C. to reduce the nickel.

The hydrogenizing splitting may be carried out, for example, with 1,2-dicyanocyclobutane prepared by the process described in U.S. patent application S.N. 3,244, filed Jan. 19, 1960, or in German specification K 39725 IVb/12o. The adipo-nitrile so obtained may be reduced to hexamethylene diamine in known manner, if desired without previous purification, for example by reduction in the presence of Raney cobalt.

The following examples serve to illustrate the invention, but they are not intended to limit it thereto, the parts being by weight:

Example 1

The catalyst used for the splitting was prepared as follows: 400 parts of a commercial, natural kieselguhr were impregnated with a solution containing 162 parts nickelous chloride hexahydrate in 1500 parts water. The nickel chloride was converted to nickel carbonate by treating it at 70 to 80° C. with a 30% sodium carbonate solution. The substance was suction-filtered, dried without previous washing and reduced at 350° C. with hydrogen. The finished catalyst had the following composition:

| | Percent by weight |
|---|---|
| Silicon dioxide | 59.5 |
| Nickel | 14.3 |
| Ferric oxide | 2.7 |
| Aluminum oxide | 2.3 |
| Potassium oxide | 0.4 |
| Sodium oxide | 6.0 |

Remainder: inert components, such as water and carbon dioxide.

The catalyst was stored under dioxan.

10 grams of the catalyst, moistened with dioxan, were mixed with 100 grams 1,2-dicyanocyclobutane and 100 grams dioxan and introduced into an 0.5 liter autoclave of refined steel (V4 A). The air was then displaced with gaseous hydrogen and hydrogen was introduced under pressure until a pressure of 150 atmospheres gage was attained. The whole was heated to 250° C., while stirring, and hydrogenized for 2 hours at that temperature, while continuing the stirring. The whole was then cooled to room temperature, released from pressure, separated from the catalyst by filtration and the solvent (dioxan) distilled off from the reaction mixture under normal pressure. About 40 grams adipo-dinitrile were then obtained in vacuo at a pressure of about 2 to 3 mm. mercury by distillation at a temperature of 130 to 150° C. The conversion amounted to about 80%. Part of the 1,2-dicyanocyclobutane used as starting material was recovered and could be recycled to the splitting process. The total yield was about 50%, calculated on the 1,2-dicyanocyclobutane used as starting material.

*Example 2*

A batch as described in Example 1 was hydrogenized with hydrogen for 1 hour at 300° C. at a pressure of 300 atmospheres gage in the presence of the catalyst described in Example 1. By vacuum distillation, a mixture of 60 grams adipo-dinitrile and 20 grams unreacted 1,2-dicyanocyclobutane was obtained, the unreacted 1,2-dicyanocyclobutane being returned to the splitting reaction, so that the total yield amounted to about 75%, calculated on the 1,2-dicyanocyclobutane used as starting material.

We claim:

1. A liquid phase process for the manufacture of adipo-dinitrile by the hydrogenizing splitting of 1,2-dicyanocyclobutane, which comprises dissolving 1,2-dicyanocyclobutane in dioxane to form a solution, treating the solution with hydrogen for a time of about ½ hour to about 3 hours, said treatment occurring in the presence of a catalyst consisting of nickel supported on kieselguhr and activated with sodium oxide, maintaining a temperature within the range of about 200 to about 400° C. during the treatment, applying a pressure during said treatment of about 100 to about 300 atmospheres gage, and distilling off the adipo-dinitrile formed after the pressure has been released.

2. A process as claimed in claim 1 wherein the hydrogen used to treat the solution is diluted with an inert gas selected from the group consisting of nitrogen, argon and mixtures thereof.

3. A process as claimed in claim 1, wherein the hydrogenation is carried out at a temperature within the range of about 250 to about 300° C.

References Cited in the file of this patent
UNITED STATES PATENTS

| | | |
|---|---|---|
| 2,504,024 | Howk et al. | Apr. 11, 1950 |
| 2,532,311 | Howk et al. | Dec. 5, 1950 |
| 2,532,312 | Romilly | Dec. 5, 1950 |
| 2,749,359 | Calkins et al. | June 5, 1956 |
| 2,867,628 | Cass | Jan. 6, 1959 |